United States Patent [19]

Moll, Jr. et al.

[11] 4,093,564

[45] June 6, 1978

[54] ELECTROCONDUCTIVE COATINGS

[75] Inventors: William F. Moll, Jr., Summit; Frank J. Botta, Linden, both of N.J.

[73] Assignee: Yara Engineering Corporation, Elizabeth, N.J.

[21] Appl. No.: 768,394

[22] Filed: Feb. 14, 1977

[51] Int. Cl.² ............................................. H01B 1/08
[52] U.S. Cl. .................................... 252/518; 252/500; 428/454
[58] Field of Search ................. 252/500, 518; 428/454

[56] References Cited

U.S. PATENT DOCUMENTS 3,639,162  2/1972  Bixler .................................. 96/1.8 X

*Primary Examiner*—Benjamin R. Padgett
*Assistant Examiner*—E. Suzanne Parr
*Attorney, Agent, or Firm*—Buell, Blenko & Ziesenheim

[57] ABSTRACT

An electroconductive clay coating for electrophotography having solvent hold-out characteristics is provided comprising an expandable clay, an alkali metal salt, and at least one organic compound from the group consisting of sugar syrups, anionic organic compounds and fluorochemicals. In those compositions using anionic organic compounds a synergism with the expanded clay appears to result.

9 Claims, No Drawings

ELECTROCONDUCTIVE COATINGS

This invention relates to electroconductive coatings and particularly to electroconductive coatings for paper or other fibrous sheet material used in electrophotography.

The use of electrophotography for copying or reproducing images from a master to one or a multiplicity of copies has become a major practice in modern business and industry. It has to a large degree relaced all prior forms of copying or reproducing such as carbon copies, photostats and the like.

A major type of electrophotography uses paper or other fibrous sheet material coated with an electrophotosensitive material such as ZnO. In use, the ZnO coating is electrically charged in the dark. When an image, such as the image of a printed page, is focused on the sheet, the ZnO in the light areas discharges, whereas that in the dark areas remains charged. Particles of an oppositely-charged pigment are cascaded over or passed in a solvent dispersion over the surface. The charged pigments will adhere to the areas remaining charged. Hence, the image is reproduced.

This procedure requires that the paper have some conductivity to lead away the charge. The maxium lateral resistivity should be not much more than $10^{10}$ ohms per square. If the resistivity is much above this figure, the image quality will be very poor to non-existent. On a relatively humid day, paper itself has proper conductivity. However, the resistivity of very dry paper is on the order of $10^{14}$ ohms per square. Inside a copying machine using electrophotographic paper on a dry day, the relative humidity can be as low as 15%. Under such conditions, something other than or in addition to the paper is needed to conduct away the charge.

The proper conductivity, as is well known, is obtained by adding a conductive layer that is positioned in the final product between the paper itself and the ZnO coating. This conductive layer must remain conductive at low relative humidities. It must not bleed through the paper because its deposition on the ZnO surface of the following sheet can result in either a very poor or no image at all on that sheet. In the past conductive layers have been formulated from many materials, including organic humectants such as glycerol, which causes an undesirably limp sheet, or inorganic humectant salts which easily strike through. Quaternary nitrogen compounds, such as vinylbenzyltrimethylammonium chloride and polymers such as sulfonated polystyrene have been used. However, some of these materials can emit an unpleasant odor during the copying process. They tend to be expensive also. Recently, Bixler has patented (U.S. Pat. No. 3,639,162) a coating using an exfoliated clay, either alone or with an electroconductive inorganic salt.

The clay-based conductive coatings such as disclosed by Bixler, however, have a serious drawback. Not only should the coating provide conductivity, but also should prevent penetration of solvent through the sheet. This becomes important because such solvent impinges on the sheet during the coating of the ZnO and also during application of the pigment from a solvent. A solvent-soaked sheet can pose problems during manufacture. It also can be an unacceptable nuisance to those using the paper in a copying machine.

Attempts to solve this problem of solvent penetration have met with several other problems. In any adaptation to meet solvent barrier requirements, the coating must still maintain adequate conductivity. Further, the rheological properties cannot be so impaired as to make the coating difficult to apply. The object of this invention is to provide a clay-based conductive coating for paper or other fibrous sheet material with solvent barrier properties and still maintain adequate conductivity and proper rheology.

The final sheet should have, ideally, the weight and feel of bond paper. Unfortunately, however, the ZnO coating generally is quite heavy (20 lb./ream), which further complicates the problem. Therefore, the conductive layer should be as light as possible and still possess the desired conductivity and solvent barrier properties. A coat weight of no more than 5 lb./ream would be desirable.

We have found that these problems can be solved by providing an electroconductive coating comprising an expandable clay, such as smectite, an alkali metal salt and an organic compound such as sugar and corn syrup, polyvinylacetate, acetylated polyvinylchloride, sulfonated polystyrene. We have also found that the addition of certain fluorochemicals improves the solvent holdout.

The invention can perhaps be best understood by reference to the following examples which compare the prior are compositions with the present invention.

In the following examples we have made reference to conductivity and resistivity measurements and to solvent penetration measurements. These measurements were carried out using the techniques described hereinafter.

For conductivity/resistivity measurements, a Keithly 621 electrometer and regulated high voltage supply and Keithly 6105 resistivity adapter were used. These measurements were made in a constant humidity room. The measurements were made at 15% relative humidity. The test voltages were 100 and 300 volts. These different voltages did not affect results perceptibly.

For solvent penetration measurements, toluene containing a red dye was used. A drop was dropped onto the sheet, allowed to remain 10 seconds, then quickly wiped off. The sheet was turned over. Any red-dyed areas revealed penetration. The amount of penetration was estimated by comparison to a chart of dyed spots of known areas. This was accurate to at least 5%.

EXAMPLES

EXAMPLE 1

To 950 ml. water we added 0.5 g. Calgon and 5 g. LiCl, and stirred with a propeller blade stirrer until all salts were dissolved. Then we slowly added 50 g. MINERAL COLLOID BP, a purified Wyoming montmorillonite product of the Georgia Kaolin Company. After measuring the Brookfield viscosity, we draw the material down on Kimberly-Clark "Kemfect" base stock with a #24 Mayer rod. The coated sheet was dried one minute at 90° C., then coat weight was measured. The sheet was equilibrated for 16 hours at 15% relative humidity, and the lateral resistivity was measured on the Keithly instrument at 300 volts. The toluene penetration was then determined. The results appear in Table I.

TABLE I

| Slurry viscosity (7.5% solids), Brookfield, centipoises | | |
|---|---|---|
| 10 | RPM | 100 |

TABLE I-continued

|  | 2820 | 360 |
| --- | --- | --- |
| Coat Weight lb./ream | Resistivity, lateral ohms/square | Penetration, toluene % |
| 2.5 | $3.9 \times 10^{10}$ | 100 |

EXAMPLE 2

A slurry of water, Calgon, LiCl and MINERAL COLLOID BP was made up as in Example 1. The 1 part Kofilm 80, a starch product of National Starch Company, per 5 parts of slurry solids was added. The viscosity was measured and the slurry was then coated on Weyerhaeuser CC base stock with a #24 Mayer rod. The sheet was dried on a print dryer. After drying the sheet was equilibrated overnight at 20% relative humidity. The lateral resistivity was measured at 300 volts. The toluene penetration was determined. The results are tabulated in Table II.

TABLE II

| Slurry viscosity (8.4% solids), Brookfield, centipoises | | |
| --- | --- | --- |
| 10 | RPM | 100 |
| 4800 | | 850 |

| Coat Weight lb./ream | Resistivity, lateral ohms/square | Penetration, toluene % |
| --- | --- | --- |
| 0.74 | $9.9 \times 10^9$ | 100 |

EXAMPLE 3

To 160 parts water we added 0.1 part Calgon and 1 part LiCl and stirred with a propeller blade stirrer until all salts were dissolved. Then we slowly added 10 parts MINERAL COLLOID BP. When this was dispersed, we added 5 parts (as received) brown Karo syrup, a product of Best Foods and mixed well. This slurry was coated onto Weyerhaeuser CC base stock using a #24 Mayer rod. The sheet was dried on a print dryer one minute. The dried sheet was equilibrated overnight at 15% relative humidity. Lateral resistivity at 100 volts was measured and the toluene penetration determined. An identical sheet was coated with a proprietary Weyerhaeuser ZnO electrophotographic coating at 19 lb./ream and run through a SCM copier. The image quality was noted. The results are tabulated in Table III.

TABLE III

| Slurry viscosity (9.2% solids), Brookfield, centipoises | | |
| --- | --- | --- |
| 10 | RPM | 100 |
| 4400 | | 640 |

| Coat Weight lb./ream | Resistivity, lateral ohms/square | Penetration, toluene % |
| --- | --- | --- |
| 1.7 | $4.5 \times 10^{10}$ | 20 |

Image quality: very good copy, good blacks, no back imaging

EXAMPLE 4

A slurry was made up as in Example 3, but using the following proportions: 150 parts water, 0.1 part Calgon, 10 parts MINERAL COLLOID BP, 2.5 parts brown Karo syrup and coated on Weyerhaeuser CC base stock, dried, equilibrated, and measured, also as in Example 3. An identical sheet was coated with a proprietary Weyerhaeuser ZnO electrophotographic coating at 19 lb./ream and run through an SCM copier. The results are tabulated in Table IV.

TABLE IV

| Slurry viscosity (7.8% solids), Brookfield, centipoises | | |
| --- | --- | --- |
| 10 | RPM | 100 |
| 2920 | | 676 |

| Coat Weight lb./ream | Resistivity, lateral ohms/square | Penetration, toluene % |
| --- | --- | --- |
| 1.3 | $9.7 \times 10^{10}$ | 40* |

*0.9 lb./ream Image quality: poor copy, heavy back imaging

EXAMPLE 5

A solution was made up as in Example 3, but using only 25 parts water and 5 parts Karo syrup. A Weyerhaeuser CC base stock sheet was coated and measurements made as in Example 3. The results appear in Table V.

TABLE V

| Coat Weight lb./ream | Resistivity, lateral ohms/square | Penetration toluene % |
| --- | --- | --- |
| 2.6 | $2.1 \times 10^{13}$ | 80 |

EXAMPLE 6

A solution was made up as in Example 3, but using only 25 parts water, 5 parts brown Karo syrup, and 1 part LiCl. A Weyerhaeuser CC base stock sheet was coated and measurements made also as in Example 3. The results appear in Table VI.

TABLE VI

| Coat Weight lb./ream | Resistivity, lateral ohms/square | Penetration, toluene % |
| --- | --- | --- |
| 2.6 | $6.3 \times 10^{11}$ | 60 |

EXAMPLE 7

A slurry was made up as in Example 3, but using the following: 110 parts water, 0.1 part Calgon, 1.0 part LiCl, 10 parts MINERAL COLLOID BP and 2.5 parts (solid basis) "Resyn 1029", a polyvinylacetate product of National Starch Company. Weyerhaeuser CC base stock was coated, dried and equilibrated and measured, also as in Example 3. The coated sheet was coated with a proprietary Weyerhaeuser ZnO electrophotographic coating at approximately 20 lb./ream and run through SCM copier. The test data is tabulated in Table VII.

TABLE VII

| Slurry viscosity (10.8% solids), Brookfield, centipoises | | |
| --- | --- | --- |
| 10 | RPM | 100 |
| 7400 | | 840 |

| Coat Weight lb./ream | Resistivity, lateral ohms/square | Penetration toluene % |
| --- | --- | --- |
| 2.3 | $1.5 \times 10^9$ | 25 |

Image quality: good copy, no back imaging

EXAMPLE 8

A slurry was made up as in Example 3, but using the following: 103 parts water, 0.05 part tetrasodium-pyrophosphate, 0.108 part $Li_2CO_3$, 10 parts MINERAL COLLOID BP, 4.47 parts (as received) "Resyn 1029". The slurry was coated on Weyerhaeuser CC base stock, and tested as in Example 7. The test data appears in Table VIII.

TABLE VIII

Slurry viscosity (9.4% solids), Brookfield, centipoises

| 10 RPM | 100 |
|---|---|
| 10,800 | 1648 |

| Coat Weight lb./ream | Resistivity, lateral ohms/square | Penetration toluene % |
|---|---|---|
| 2.0 | $4.1 \times 10^8$ | 35 |

EXAMPLE 9

To 517 g. water was added 0.25 g. tetrasodium-pyrophosphate and 0.54 g. $Li_2CO_3$, and mixed at low shear with a propeller blade mixer until all salts were dissolved. The solution was heated to 50° C. and 50 g. MINERAL COLLOID BP was added under gently stirring. Then 22.35 g. (as received) "Resyn 1029" was added. With a #24 Mayer rod, Weyerhaeuser CC base stock was coated, dired one minute on a print dryer and equilibrated overnight at 15% relative humidity. The lateral resistivity at 100 volts was measured. The toluene penetration was determined. To an identical sheet, 20 lbs./ream of proprietary Weyerhaeuser ZnO electrophotographic coating was applied. The sheets were run through a SCM copier. Image quality was noted. All data is tabulated in Table IX.

TABLE IX

Slurry viscosity (10.0% solids), Brookfield, centipoises

| 10 RPM | 100 |
|---|---|
| 8400 | 1760 |

| Coat Weight lb./ream | Resistivity, lateral ohms/square | Penetration toluene % |
|---|---|---|
| 2.2 | $1.3 \times 10^9$ | 25 |

EXAMPLE 10

To 547 g. water was added 0.5 g. Calgon and 5.0 g. Licl and stirred with a propeller blade mixer. After the salts were dissolved, 50 g. MINERAL COLLOID BP was added. Then 27.8 g. RP 1444, an anionic conductive resin composed of sulfonated polystyrene and manufactured by the Monsanto Company was added. Because of the exceedingly high voscosity, the material was discarded.

TABLE X

Slurry viscosity (9.5% solids), Brookfield, centipoises

| 10 RPM | 100 |
|---|---|
| 32,800 | 3840 |

EXAMPLE 11

To 527 g. water was added 0.5 g. Calgon and stirred with a propeller blade stirrer. After the Calgon was dissolved, 50 g. MINERAL COLLOID BP was added. Then 11.1 g. RP 1444 and 17.9 g. "Resyn 1029" was added. Because of the exceedingly high viscosity, the material was discarded.

TABLE XI

Slurry viscosity (9.6% solids), Brookfield, centipoises

| 10 RPM | 100 |
|---|---|

TABLE XI-continued

Slurry viscosity (9.6% solids), Brookfield, centipoises

| 17,000 | 2780 |
|---|---|

EXAMPLE 12

To 571 g. water was added 0.5 g. Calgon and 5.0 g. LiCl and stirred with a propeller blade stirrer. After the salts were dissolved, 50 g. MINERAL COLLOID BP was added. Then 11.1 g. RP 1444 and 17.9 g. "Resyn 1029" were added and the viscosity was measured. One set of sheets of Weyerhaeuser CC raw stock was coated on one side with a #24 Mayer rod. Another set was coated on both sides with a hand trailing blade. The sheets were dried one minute in an oven at 90° C. The toluene penetration was determined and the sheets coated on both sides were equilibrated overnight at 15% relative humidity and measured the resistivity on the Keithly instrument at 100 volts. The felt side of the double coated sheets were coated with a proprietary Weyerhaeuser ZnO electrophotograhic coating at approximately 20 lb./ream and run through a SCM copier. The image quality was noted. The test data appears in Table XII.

TABLE XII

Slurry viscosity (8.8% solids), Brookfield, centipoises

| 10 RPM | 100 |
|---|---|
| 6800 | 980 |

| Coat Weight (coated one side) lb./ream | Penetration, Toluene, % |
|---|---|
| 2.5 | 85 |

| Coat Weight (coated 2 sides) lb./ream | Resistivity, lateral ohms/square | | penetration, Toluene,% |
|---|---|---|---|
| | wire side | felt side | |
| 2.0 | $2.4 \times 10^{10}$ | $2.6 \times 10^{10}$ | 90 |

Image quality: good, no back imaging, slight back marking

EXAMPLE 13

Follow Example 12 except also 3 g. FC-807, a fluorochemical manufactured by 3M Company was added, after the addition of "Resyn 1029". The results appear in Table XIII.

TABLE XIII

Slurry viscosity (10.0% solids), Brookfield, centipoises

| 10 RPM | 100 |
|---|---|
| 6000 | 840 |

| Coat Weight (coated one side) lb./ream | Penetration, Toluene,% |
|---|---|
| 1.9 | 15 |

| Coat Weight (coated 2 sides) lb./ream | Resistivity, lateral ohms/square | | penetration Toluene,% |
|---|---|---|---|
| | wire side | felt side | |
| 1.7 | $2.9 \times 10^{10}$ | $3.3 \times 10^{10}$ | 20 |

Image quality: good, no back imaging, slight back marking

EXAMPLE 14

To 550 g. water was added 0.5 g. Calgon and 5.0 g. NaCl and stirred with a propeller blade stirrer. After the salts were dissolved, 50 g. MINERAL COLLOID BP was added. Then 5.0 g. RP 1444 was added. For the application and measurement of this material, follow Example 12. The test data appears in Table XIV.

TABLE XIV

| Slurry viscosity (8.4% solids), Brookfield, centipoises | | |
|---|---|---|
| 10 RPM | | 100 |
| 10,400 | | 1560 |

| Coat Weight (coated one side) lb./ream | Penetration, Toluene,% |
|---|---|
| 4.4 | 60 |

| Coat Weight (coat 2 sides) lb./ream | Resistivity, lateral ohms/square | | Penetration Toluene,% |
|---|---|---|---|
| | wire side | felt side | |
| 3.3 | 1.6 × 10$^{10}$ | 1.3 × 10$^{10}$ | 85 |

Image quality: good, no back imaging, moderate back marking

EXAMPLE 15

Follow Example 14 except also 3.0 g. FC 807 was added after the addition of RP 1444. The test data appears in Table XV.

TABLE XV

| Slurry viscosity (8.9% solids), Brookfield, centipoises | | |
|---|---|---|
| 10 RPM | | 100 |
| 7800 | | 1080 |

| Coat Weight (coated one side) lb./ream | Penetration, Toluene,% |
|---|---|
| 2.3 | 15 |

| Coat Weight (coated 2 sides) lb./ream | Resistivity, lateral ohm/square | | Penetration Toluene,% |
|---|---|---|---|
| | wire side | felt side | |
| 1.4 | 1.3 × 10$^{10}$ | 2.0 × 10$^{10}$ | 15 |

Image quality: good, no back imaging, slight back marking

EXAMPLE 16

To 601 g. water was added 0.5 g. Calgon and 7.5 g. LiCl and stirred with a propeller blade stirrer. After the salts were dissolved, 50 g. MINERAL COLLOID BP was added. Then 5.0 g. RP 1444, 10.0 g. "Resyn 1029" and 7.5 g. FC-808, emulsified fluorochemical manufactured by 3M Company were added. For application and measurement of this material, follow Example 12. The test data is set out in Table XVI.

TABLE XVI

| Slurry Viscosity (9.7% solids), Brookfield, centipoises | | |
|---|---|---|
| 10 RPM | | 100 |
| 5800 | | 840 |

| Coat Weight (coated one side) lb./ream | Penetration, Toluene,% |
|---|---|
| 2.0 | 20 |

| Coat Weight (coated 2 sides) lb./ream | Resistivity, lateral ohms/square | |
|---|---|---|
| | wire side | flet side |
| 1.3 | 7.2 × 10$^{10}$ | 5.5 × 10$^{10}$ |

EXAMPLE 17

To 150 parts water was added 0.1 part Calgon and stirred with propeller blade stirrer until Calgon was dissolved. Then slowly was added 10 parts MINERAL COLLOID BP. When this was dispersed, 2 parts of a Dow vinylbenzyltrimethylammonium chloride cationic conductive coating was added.

A thick paste resulted, which was unsuited for coating.

EXAMPLE 18

To 827 g. water was added 0.5 g. Calgon and 0.3 g. NaCl and stirred with a propeller blade mixer. After the salts were dissolved, 50 g. of MINERAL COLLOID BP was added. Then 25 g. Of a 10% solution of Vinol 205-K, an acetylated polyvinyl alcohol product of Air Products Company, and 3.0 g. FC 807 (3M Company) were added. For application and measurement of this material, follow Example 12. The test data appears in Table XVIII.

TABLE XVIII

| Slurry viscosity (5.5% solids), Brookfield, centipoises | | |
|---|---|---|
| 10 RPM | | 100 |
| 600 | | 204 |

| Coat Weight (coated 2 sides) lb./ream | Resistivity, lateral ohms/square | | Penetration Toluene,% |
|---|---|---|---|
| | wire side | felt side | |
| 3.0 | 3.0 × 10$^{10}$ | 4.5 × 10$^{10}$ | 30 |

Example 1 covers a conductive coating consisting of an alkali metal salt and a clay, such as described in the prior art patent to Bixler. Note that although it has adequate conductivity, it totally lacks solvent holdout. Example 2 is similar, but contains a starch-base binder used in some paper coating applications. Again, solvent holdout is absent.

Example 3 concerns a similar composition, but contains a sugar syrup as proposed by this invention. Here the viscosity and conductivity are the same order of magnitude as Examples 1 and 2, but the solvent holdout dramatically improves. The complete sheet, made by using this conductive composition and a ZnO electrophotosensitive coating, makes an excellent copy in a commercial copy machine. Thus, the coating not only provides desirable electrical properties, but also the necessary solvent barrier properties.

Examples 4, 5 and 6 show the effects of using sugar syrup alone or with LiCl as a conductive coating. None are successful owing to poor image, low conductivity or poor solvent holdout. These examples show that the presence of the layer silicate (expandable clay such as montmorillonite) in such compositions (see Example 3) is essential.

Not only sugar syrups, but also certain organic polymeric compounds can be used to enhance solvent barrier properties without harming conductivity or causing excessive viscosities. Examples 7, 8 and 9 show the use of a polyvinyl acetate, with two inorganic salts, LiCl and Li$_2$CO$_3$, and the layer silicate. The use of heat in reducing the viscosity of the Li$_2$CO$_3$ composition is an interesting modification. These compositions possess both adequate conductivity and solvent barrier properties and produce in finished sheet the good copy capabilities desired.

A synergism between the layer silicate and the purely organic conductive coatings appears to be present in all cases. Unfortunately, however, the composition of cationic polymers such as vinylbenzyltrimethylammonium chloride and montmorillonite exhibited excessive viscosities (see Example 17). Compositions using anionic conductive polymers such as sulfonated polystyrene were much more successful and it appears that only anionic conductive polymers are useful in the system. Examples 10, 11, 12 and 13 show that an adequate composition contains not only the anionic polymer and layer silicate, but also amounts of LiCl, polyvinylacetate and a fluorochemical. The fluorochemical imparts added solvent barrier properties. A finished sheet using the composition in Example 13 gives good copies.

Further, a successful coating can be made with the anionic polymer, layer silicate, and fluorochemical without polyvinyl acetate if NaCl is the inorganic salt, as shown by Example 15. This composition, without the fluorochemical, exhibits excessive solvent penetration. Polyvinylacetate can be included, if desired, as indicated by Example 16.

The polymers used in conjunction with the layer silicate are not limited to those previously enumerated. Example 18 shows the use of an acetylated polyvinyl alcohol. This composition has good conductivity and rather adequate solvent holdout.

The foregoing examples show that the present invention improves expandable clay-based conductive coatings so that they have adequate solvent holdout properties as well as adequate conductivities even at relative humidities at least as low as 15%. Such properties at such low relative humidities are essential for a commercially usable product. These properties are achieved at coat weights less than 5 pounds per ream, usually less than 3 pounds per ream (25 × 38–500).

In the foregoing specification we have illustrated and described certain preferred practices and compositions of our invention, however, it will be understood that this invention may be otherwise embodied within the scope of the following claims.

We claim:

1. An electroconducting clay composition for electrophotography having solvent holdout characteristics comprising an expandable clay, an alkali metal salt and at least one organic compound from the group consisting of sugar and corn syrups, polyvinylacetate, acetylated polyvinylchloride, sulfonated polystyrene and fluorochemicals.

2. An electroconducting clay composition as claimed in claim 1 wherein the expandable clay is montmorillonite.

3. An electroconducting clay composition as claimed in claim 1 wherein the alkali metal salt is lithium chloride.

4. An electroconducting clay composition as claimed in claim 1 wherein the alkali metal salt is sodium chloride.

5. An electroconducting clay composition as claimed in claim 1 wherein the organic compound is corn syrup.

6. An electroconducting clay composition as claimed in claim 1 wherein the organic compound is polyvinylacetate.

7. An electroconducting clay composition as claimed in claim 1 wherein the organic compound is acetylated polyvinylchloride.

8. An electroconducting clay composition as claimed in claim 1 wherein the organic compound is sulfonated polystyrene.

9. An electroconducting clay composition as claimed in claim 1 wherein the organic compound is a mixture of sulfonated polystyrene and a fluorochemical.

* * * * *

UNITED STATES PATENT OFFICE
CERTIFICATE OF CORRECTION

Patent No. 4,093,564  Dated June 6, 1978

Inventor(s) William F. Moll, Jr. and Frank J. Botta

It is certified that error appears in the above-identified patent and that said Letters Patent are hereby corrected as shown below:

Column 2, line 27, "are" should be --art--.

Column 5, line 19, "gently" should be --gentle--.

Column 5, line 22, "dired" should be --dried--.

Column 5, about line 39, at the end of Table IX, insert --Image quality: good copy, no back imaging--.

Column 6, line 23, "electrophotograhic" should be --electrophotographic--.

Column 7, line 13, "(coat 2 sides)" should be --(coated 2 sides)--.

Column 7, about line 58, "flet side" should be --felt side--.

Column 8, line 8, "Of" should be --of--.

Signed and Sealed this

Thirty-first Day of October 1978

[SEAL]

Attest:

RUTH C. MASON
Attesting Officer

DONALD W. BANNER
Commissioner of Patents and Trademarks